United States Patent Office

2,861,971
Patented Nov. 25, 1958

2,861,971

HARDENABLE RESINOUS MIXTURES CONTAINING A HALOGEN HYDRIN AND PROCESSES FOR PRODUCING AND HARDENING SAME

Wolfgang Ritter, Ludwigshafen (Rhine), Ferdinand Meyer, Mannheim, and Kurt Demmler, Heidelberg, Germany, assignors to Badische Anilin- & Soda-Fabrik Aktiengesellschaft, Ludwigshafen (Rhine), Germany No Drawing. Application March 22, 1955
Serial No. 496,056

Claims priority, application Germany March 23, 1954

8 Claims. (Cl. 260—43)

This invention relates to hardenable mixtures comprising a halogen hydrin and a hardening resin and to a process for the production of such resin mixtures.

In the copending application Ser. No. 274,668, filed on March 3, 1952, by Hans Krzikalla, Ferdinand Meyer and Frederic van Taack-Trakranen there is described a process of manufacturing oxygen-containing resins by reacting non-alkylated polynuclear aromatic hydrocarbons with aldehydes or polymers of aldehydes and condensing then the obtained reaction product with a phenol.

By the process of said application reactive resins having an oxygen content of from 5–12% are obtained by reacting non-alkylated polynuclear aromatic hydrocarbons, as for example naphthalene, phenanthrene or technical-grade mixtures of these substances, with more than 1.5 times preferably 3–4 the molar ratio of an aldehyde, advantageously formaldehyde or its homopolymers, such as paraformaldehyde, in the presence of dilute mineral acids, for instance aqueous sulfuric or phosphoric acid, having an approximate acid concentration of about 10% to 50% by weight, for only such a time that the resulting resins are still clearly soluble in ethyl alcohol after heating with about equal amounts of phenol and an acid catalyst at a temperature from 100° to 155° C. until the water formed is removed. The further reaction of these oxygen-containing resins with phenols is carried out by heating the oxygen-containing condensation product of the non-alkylated polynuclear aromatic hydrocarbon and an aldehyde with a phenol in the presence of an acid catalyst preferably to a temperature between 120° and 155° C. for about 5 to 7 hours. Examples of acid catalysts applicable for the reaction of the oxygen-containing resin with the phenol are for instance benzene sulfonic acid, sulfuric acid, hydrochloric acid, boronfluoride, acetic acid, p-toluenesulfochloride and surface active bleaching earth.

The copending application Ser. No. 275,668, filed on March 9, 1952, by Hans Krzikalla, Ferdinand Meyer and Frederic van Taack-Trakranen is directed to a process for the production of hardenable resins. According to this application reaction products of a phenol with an oxygen-containing condensation product of an aromatic hydrocarbon and an aldehyde with an oxygen content of from 5 to 12% by weight, preferably the reaction products of the process described in the afore-mentioned copending application Ser. No. 274,668, are subsequently condensed with aldehydes, such as formaldehyde or its homopolymers, preferably in the presence of a phenol or another compound which is capable of reacting only with a free aldehyde with the formation of hardenable resins. The products obtained according to this process are as a rule very viscous and hence it is difficult to work them up with fillers, such as graphite or heavy spar; on the other hand these products are not suitable as putty resins.

It is one of the primary objects of the present invention to prepare an improved hardenable resin from the condensation product of an aldehyde, a phenol or another compound which reacts with formaldehyde to form a resin and a condensation product of a phenol with an oxygen-containing condensation product of an aromatic hydrocarbon and an aldehyde with an oxygen-content of from about 5% to about 12% by weight.

A more particular object is the preparation of an improved resin from the condensation product of formaldehyde or its homopolymers, phenol and a condensation product of phenol with an oxygen-containing condensation product of naphthalene and formaldehyde with an oxygen content of from about 5% to about 12% by weight.

Another object of the invention is a hardenable resin mixture of the aforesaid resins and a compound which has no hardening action but which condense into the resin during the hardening of the same.

A further object of the invention are hardenable resinous mixtures containing a filler.

The foregoing objects and other objects, which will be apparent from the more detailed description of the invention, are obtained by adding a halogen hydrin to a hardenable resin prepared by condensing an aldehyde, preferably formaldehyde or a homopolymer of formaldehyde, a phenol or another compound yielding a resin only with a free aldehyde and a reaction product of a phenol and an oxygen-containing condensation product of an aromatic hydrocarbon and an aldehyde, preferably formaldehyde or its homopolymers, with an oxygen content of about 5% to about 12% by weight. Suitable halogen hydrins are for example ethylene chlorhydringlycerol, monochlorhydringlycerol, dichlorhydrin, epichlorhydrin or dichlorbutylene oxide single or in admixture with each other. The halogen hydrins themselves have no hardening action and condense into the resins during the hardening of the same.

The halogen hydrin is added in amounts from 1 to 25% to the hardenable resin after the condensation and after the separation of the greater part of the water. It is preferable to remove the water still present in the resin after the addition of the halogenhydrin by an azeotropic distillation, advantageously under reduced pressure. For obtaining a homogeneous mixture of the resin and the halogen hydrin it is advantageous to heat the mixture to a temperature between 50° C. and 90° C. The resinous mixture according to this invention may be hardened by heat and/or by the addition of conventional acid hardening catalysts for thermosetting resins. The mixtures are prepared by working them until a homogeneous spreadable mass is obtained. All kinds of fillers may be incorporated, for example inorganic fillers such as heavy spar, graphite, silicates, clays or porcelainous powder. The fillers may be incorporated in the spreadable masses in amounts of 20% to 80%.

The masses thus prepared may be used as puttying, plastering or coating masses, and also for the production of shaped articles, and harden after a short time.

The following examples will further illustrate this invention but the invention is not restricted to these Examples. The parts are parts by weight.

Example 1

114 parts of 98% paraformaldehyde are dissolved in 115 parts of water and 85 parts of concentrated sulfuric acid while heating and 120 parts of naphthalene are entered slowly into the solution at a temperature of 90° to 100° C. Then the reaction mixture is heated to boiling with reflux cooling. Resinification starts after 2–3 hours. Heating is continued until the free, unreacted naphthalene is bound.

Samples taken, when heated with about the same proportion (by weight) of phenol and a trace of toluene sulfochloride and taken up with five times the amount of alcohol, give completely clear solutions. The formation of over-condensed resins will be indicated by an inferior solubility of these reaction products with phenol in alcohol.

The reaction mass is then allowed to cool, the aqueous layer is siphoned off and, any residual acids having been neutralized, the unreacted formaldehyde is distilled over with sodium carbonate and any free naphthalene is distilled over with steam. The resin is then dissolved in benzene and the solution is allowed to settle down for clarification. From the clear solution, by evaporating the benzene, when needed in vacuo, a clear, pale yellow, viscous resin is obtained which is soluble in aromatic hydrocarbons, glycol, tetrahydrofurane and methylene chloride. It has a softening point of 52° C. and an oxygen content of 7.5%.

2,160 parts of this resin are dissolved in 2,470 parts of phenol while heating to 120° C. and, while adding 3.2 parts of p-toluene sulfochloride with stirring, the temperature is slowly raised from 130° C. to 155° C., some 300 to 400 grams of water distilling off in admixture with traces of phenol. When no more water is distilled over, stirring is discontinued and the resin is allowed to cool. There are obtained 4,200 parts of a viscous resin.

*Example 2*

700 parts of the resin obtained in Example 1 are dissolved in 2,016 parts of phenol at 60° C. and the solution after having been combined with 238 parts of sodium sulfite, is condensed with 3,122 parts of 30% aqueous formaldehyde for 15 minutes with reflux cooling. After cooling to 70° C. 1,542 parts of water are distilled off in vacuo, when 300 parts of ethylene chlorohydrine are added. Then 175 parts of an azeotropic mixture of water and ethylene chlorohydrin are distilled off at a pressure of 45 millimeters Hg up to an internal temperature of 75° C., another 700 parts of ethylene chlorohydrin are added and the reaction mixture is immediately cooled down to ambient temperature after thorough mixing. There are obtained 4,515 parts of a dark-brown, viscous mass.

1 part thereof is mixed with 1 part of a graphite powder containing 6% of sulfuric acid. This mixture hardens within 6 hours at room temperature. It is completely stable to dilute and concentrated acids and alkalies as well as to solvents. It is eminently suitable as a putty resistant to corrosion.

The mixture is prepared in a porcelain dish or an enameled sheet iron bowl by working them with a knife-shaped steel spatula until a homogeneous spreadable mass is obtained.

*Example 3*

1,300 parts of the resin obtained in Example 1 are dissolved in 1,300 parts of phenol at 60° C. and the solution, after having been combined with 195 parts of sodium sulfite, is condensed with 2,366 parts of 30% aqueous formaldehyde for 15 minutes with reflux cooling. After cooling to 70° C. 1,555 parts of water are distilled off in vacuo, when 300 parts of ethylene chlorohydrin are added. Then 160 parts of an azeotropic mixture of water and ethylene chlorohydrin are distilled off at a pressure of 45 millimeters Hg up to an internal temperature of 75° C., another 700 parts of ethylene chlorohydrin are added and immediately cooled down to ambient temperature after thorough mixing. There are obtained 4,150 parts of a dark-brown viscous mass. After mixing with a graphite powder containing 6% of sulfuric acid, it hardens after 4 days at room temperature.

*Example 4*

280 parts of the resin obtained in Example 1 are dissolved in 806 parts of phenol at 60° C. and the solution, after having been combined with 94 parts of sodium sulfite, is condensed with 1,248 parts of 30% aqueous formaldehyde for 15 minutes with reflux cooling. After cooling to 70° C. 955 parts of water are distilled off in vacuo (21 mm. Hg) up to an internal temperature of 74° C. The resin, while still warm, is combined with 70 parts of ethylene chlorohydrin and 324 parts of furfurol while stirring and then cooled down at once to ambient temperature. A graphite powder containing 6% of sulfuric acid is added to this mixture in the ratio 1:1. The whole mixture hardens within four days at room temperature.

We claim:
1. A hardenable resinous mixture which comprises (*a*) a hardenable resin prepared by condensing (1) a compound selected from the class consisting of formaldehyde and para-formaldehyde, (2) phenol, and (3) a reaction product of phenol and an oxygen-containing condensation product of a non-alkylated polynuclear aromatic hydrocarbon and a compound selected from the class consisting of formaldehyde and para-formaldehyde; and (*b*) a compound selected from the class consisting of aliphatic halogen hydrins and epihalogen hydrins.

2. A hardenable resinous mixture according to claim 1 in which the non-alkylated polynuclear aromatic hydrocarbon used is naphthalene.

3. A hardenable resinous mixture according to claim 1 in which the aliphatic halogen hydrin used is ethylene chlorhydrin.

4. A hardenable resinous mixture according to claim 1 containing also furfurol.

5. A hardenable resinous mixture according to claim 1 containing also a filler.

6. A process for the production of hardened resins which comprises hardening a resinous mixture as claimed in claim 1 by heating.

7. A process for the production of hardened resins which comprises hardening a resinous mixture as claimed in claim 1 by mixing this resinous mixture with an acid hardening catalyst for thermosetting resins.

8. A process for the production of a hardenable resin mixture which comprises incorporating in the absence of an alkali a compound selected from the group consisting of aliphatic halogen hydrins and epihalogen hydrins in amounts from 1 to 25 percent in a hardenable resin prepared by condensing (1) a member selected from the group consisting of formaldehyde and para-formaldehyde, (2) phenol, and (3) a reaction product of phenol and an oxygen-containing condensation product of naphthalene and a member of the group selected from the class consisting of formaldehyde and para-formaldehyde, removing azeotropically the water contained in the resin prepared by the aforesaid condensing, and adding a further amount of an aliphatic halogen hydrin.

References Cited in the file of this patent

UNITED STATES PATENTS

| | | |
|---|---|---|
| 2,330,827 | Kester | Oct. 5, 1943 |
| 2,695,894 | D'Alelio | Nov. 30, 1954 |

FOREIGN PATENTS

| | | |
|---|---|---|
| 576,745 | Great Britain | Apr. 17, 1946 |